Sept. 16, 1924.                                               1,508,914
                          E. H. BELDEN
                  LUBRICATING SYSTEM FOR ENGINES
                        Filed July 25, 1918
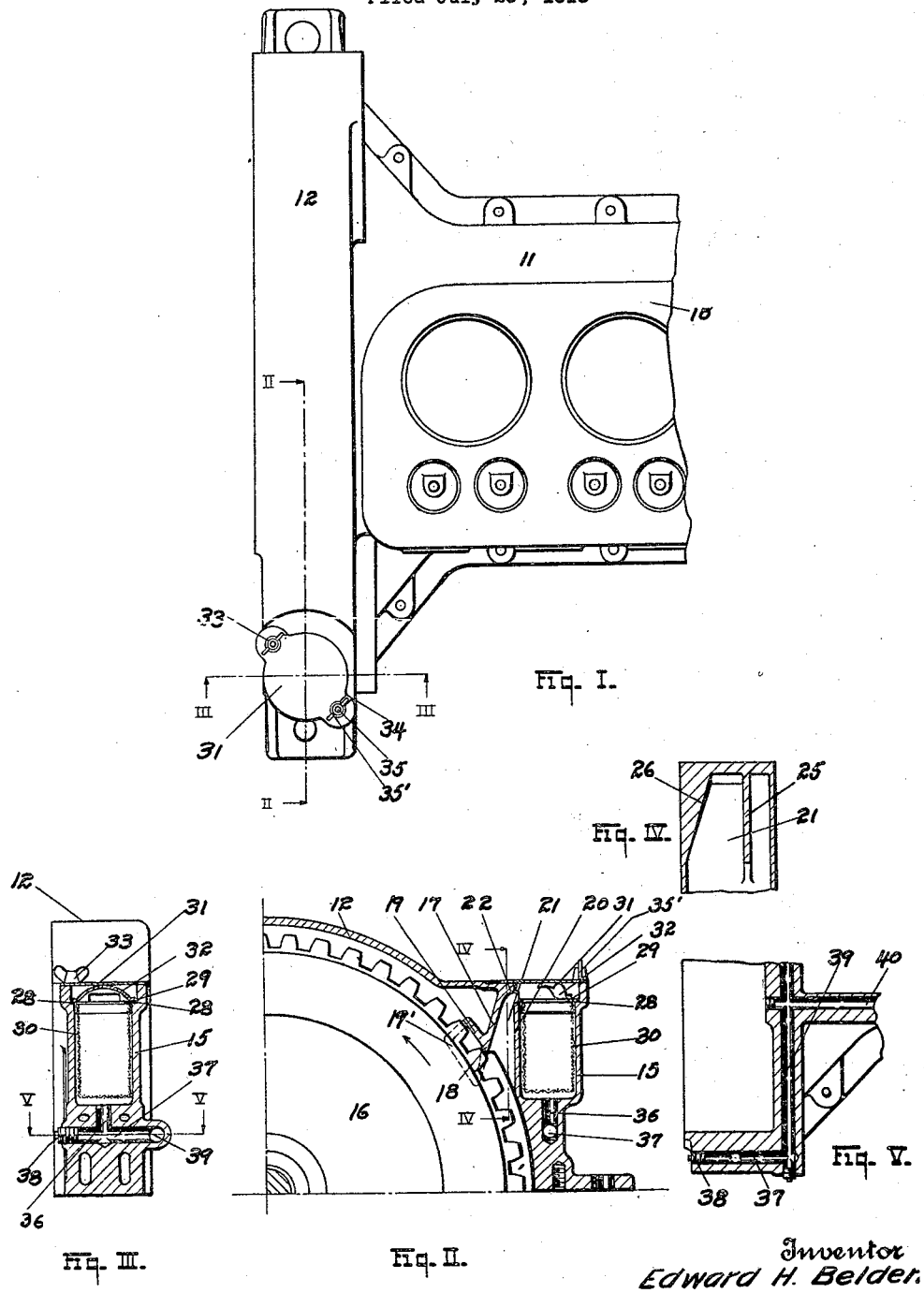
Inventor
Edward H. Belden.

Patented Sept. 16, 1924.

1,508,914

UNITED STATES PATENT OFFICE.

EDWARD H. BELDEN, OF TOLEDO, OHIO, ASSIGNOR, BY MESNE ASSIGNMENTS, TO THE WILLYS-OVERLAND COMPANY, OF TOLEDO, OHIO, A CORPORATION OF OHIO.

LUBRICATING SYSTEM FOR ENGINES.

Application filed July 25, 1918. Serial No. 246,785.

*To all whom it may concern:*

Be it known that I, EDWARD H. BELDEN, a citizen of the United States, residing at Toledo, in the county of Lucas and State of Ohio, have invented certain new and useful Improvements in Lubricating Systems for Engines, of which I declare the following to be a full, clear, and exact description.

This invention relates to an improved lubricating system for engines, particularly internal combustion engines, and has for its objects to provide an improved, simplified and efficient arrangement for collecting oil raised from the casing for the engine by one of the rotating elements thereof and delivered to a collecting reservoir from whence it may be distributed—as by gravity—to the bearings to be lubricated. One of the principal features of the present construction relates to the relation of parts and location of the receiving reservoir relative to the housing or casing for the engine and a rotating element thereof, the arrangement being such that oil raised from the bottom of the casing for the engine by the rotating element is thrown centrifugally by a direct, tangential passage into the receiving reservoir. By such an arrangement, a particularly sufficient oil collecting system is provided so that practically all the oil may be raised by and collected from the rotating element so as to be re-distributed to the various bearings of the engine, and thus by such a means an efficient and constant circulation of the lubricant is maintained throughout the lubricating system.

Further objects of the invention are to provide improved means for deflecting and removing therefrom the oil raised by the rotating element of the engine to direct the same into the tangentially located collecting chamber; to provide a novel arrangement of collecting reservoir formed, for example, as a part of the casing for the engine; and to provide a simplified arrangement of conduit for delivering the oil from the receptacle to the various bearings in the engine.

Further objects of the invention relate to the details of construction, arrangement of parts, and various associations of elements disclosed herein, although it is to be understood that the invention is not limited to such construction, but contemplates broadly any arrangement for attaining the ends thought and attained herein.

Referring to the drawing, Figure I is a top plan view of a portion of an internal combustion engine showing the cylinder block and fly wheel casing with my invention incorporated therein.

Figure II is a sectional view on the line II—II of Figure I.

Figure III is a section view on the line III—III of Figure I.

Figure IV is a sectional view on line IV—IV of Figure II, and

Figure V is a sectional view on the line V—V of Figure III.

In the drawing, similar reference numerals refer to similar parts throughout the several views, and the sectional views are taken looking in the direction of the arrow at the end of the section line.

In the arrangement shown in the drawing which is chosen as one exemplification of the invention, the cylinder block 10 is shown in plan with the cylinder head removed, the upper portion of the crank casing being shown at 11 and the fly wheel casing indicated at 12. The casing 12 as shown in Figure II is enlarged at one side on the edge face thereof to form a collecting reservoir 15 located peripherally of the fly wheel 16 and connected to the interior of the casing 12 by a direct tangential passage 21. The casing 12 is also provided with a downwardly extending member 17 having a relatively sharp edge 18 and a rearward extension 19, the edge 18 and rear portion 19 being located in close proximity to the peripheral edge of the fly wheel 16. The portion 19 extends downwardly as at 19' on either side of the edge of the fly wheel, the edge 18 and sides 19' closely surrounding the edge and sides of the fly wheel, as will be apparent from the drawings, the fly wheel being shown as provided with gear teeth which is of a usual construction for co-operating with the self starting mechanism of an internal combustion engine.

The passage 21 referred to may be formed between the deflector 17 and the rear wall 20 of the reservoir 15 and is located on the edge of and substantially tangential to the periphery of the fly wheel 16, the deflector 17 being slightly curved as at 22 so that oil delivered to the passage 21 will be directly thrown into the top portion of the collecting reservoir 15. The reservoir 15 may be somewhat narrower than the depth of the casing 12 and therefore a web or partition 25 shown in Figure IV is provided to form the rear wall of the passage 21, shown in Figure II. Moreover, the front wall 26 may be inclined as clearly indicated in Figure IV to the delivery passage 21 shown, these details, however, being unessential to the broad aspect of the invention.

The reservoir 15 may be provided adjacent to the upper portion thereof with a ledge 28 to receive and support the rim 29 of a strainer 30 located within reservoir 15. A pivoted lid 31 may be provided for the reservoir 15 and, if desired, a bow spring 32 may be interposed between the lid 31 and the rim 29 of the strainer to maintain the strainer in position in the reservoir 15. In the particular construction shown, the lid 31 is pivoted at 33 to the casing 12, while the other end of the lid is provided with a notch 34 to swing around a stud 35 on the casing 12, while a thumb nut 35′ may be used to bind the lid in proper position.

As shown in Figure III, the bottom of the reservoir 15 is connected by a passage 36 to a transfer conduit 37. These passages and conduits may be formed with the original casting of the casing 12 and in such case one end of the passage 37 is provided with a plug 38. The conduit 37 is connected with a transversely extending conduit 39 which passes along the rear portion of the casing 12 and is connected with suitable cross conduits, such as that shown in 40 to deliver the oil from the receptacle 15 to the various bearings to be lubricated.

The operation of the invention thus described will, it is believed, be readily understood from the foregoing. The rotation of an element of the engine proper, such as, for example, the geared fly wheel 16, will operate as means to raise oil which collects in the bottom portion of the crank casing of an engine, and by centrifugal action throw the same off the edge thereof into the tangential passage 21 and deliver the oil directly into the receiving chamber 15. By locating the passage 21 tangentially and peripherally of the gear casing 12 and also locating the reservoir 15 on the edge thereof in direct line to receive the oil as thrown naturally by the rotation of the rotating element, particularly efficient means are provided for collecting the oil as the same is delivered from the rotating fly wheel.

Moreover, the deflector 17 with the edge 18 thereof also cooperate with the particular arrangement referred to, to divert the oil carried around with the fly wheel into the passage 21 and to the receptacle 15, more particularly by reason of the edge 18 and sides 19′ each being in close proximity to the peripheral edge and sides of the fly wheel, with a result that practically all of the oil raised by the rotary action of the fly wheel from the bottom of the casing will be delivered directly to the receptacle 15 through the passage 21. By use of the conduits 36, 37 and 39, shown herein, or by use of any suitable passage, it will be readily apparent that the oil thus collected in the reservoir 15 may be delivered as desired to any of the bearings of the mechanism.

The oil as it is thrown upwardly by the fly-wheel strikes the baffle plate and is directed upwardly thereby through a restricted passage 21 into the oil reservoir into which it is forced under pressure so that the pressure of the oil in the reservoir is considerably above the normal atmospheric pressure. The pressure thus obtained tends to facilitate the passage of the oil through the strainer which might eventually become clogged if gravity alone were relied upon to carry the oil to the bearings. The baffle plate is formed so that the oil leaving the fly-wheel is directed upwardly and outwardly in a tangential direction from the fly-wheel into the reservoir whereby the presure in the reservoir is increased beyond the normal atmospheric pressure.

The cover 31 may be readily removed when desired from the top of the casing reservoir 15 by loosening the thumb nut 35′ and swinging the lid 31 about its pivot 33, whereupon the strainer 30 may be removed to clean the same if necessary. When the lid is retained in place over the reservoir 15, the same operates through the medium of the bow spring 32 to hold the strainer 30 in proper position.

It is apparent that the particular embodiment, which has been shown and described by way of illustration, is susceptible of wide variation without departing from the spirit and scope of this invention, and, therefore, I desire to claim the same broadly without limitation to the details of construction or particular arrangement of parts shown.

Having thus described my invention, what I claim as new and desire to secure by Letters Patent, is:

1. In a lubricating system for engines, means for collecting oil for distribution therefrom by gravity to the bearings of the engine, including in combination a casing for a rotary element of said engine, a reservoir in the plane of said element and a tangential passage on the edge face of the casing, connecting said casing with said reservoir, whereby oil raised from said casing by said rotary element may be thrown directly into said reservoir.

2. In an engine, having a casing and a rotary element, the combination therewith of an oil reservoir located in the plane of said casing and communicating therewith, and a deflector extending into close proximity with the edge of the said rotating element to direct oil carried upwardly by said rotating member to said reservoir.

3. In a casing for a rotating element of an internal combustion engine, the combination therewith of a reservoir located at the peripheral edge thereof and in the plane of the casing, a conduit located tangentially of said casing connecting said casing with said reservoir, and means whereby oil raised by the rotating element of said engine may be thrown centrifugally into said conduit and directly delivered to said reservoir.

4. In combination with the casing of a rotating element of an engine, a reservoir formed in the plane of said casing at the periphery thereof and in communication therewith, and a deflector carried by said casing and extending into close proximity with the peripheral edge of the rotating member of said engine.

5. In combination with the casing of a rotating element of an engine and oil collecting reservoir located in the plane of the casing and having a connecting passage with the interior of said casing, means for deflecting oil thrown from said element into said passage and a conduit formed integrally with said casing for delivering oil collected in said reservoir to the bearings of said engine.

6. In combination with a casing of a rotary element of an engine, an oil collecting reservoir located in the plane of the casing, a conduit connecting said reservoir with the interior of said casing, said conduit being provided with a tapering side wall formed integral with said casing, the conduit being also provided with a deflecting wall terminating with a sharp edge adjacent to the path of travel of the rotating member.

7. In a lubricating system for engines, the combination with a casing for a rotary element thereof, of an oil collecting reservoir located in the plane of the casing, and a deflector for directing oil raised by the rotating element of said engine into said reservoir, the deflector including a sharp edged portion extending across the periphery of said rotating element and provided with side portions extending radially in close proximity with either side of said rotating member.

8. A lubricating system for engines, the combination with a casing for a rotary element thereof, of an oil collecting reservoir located in the plane of the casing, and a deflector for directing oil raised by the rotating element of said engine into said reservoir, the deflector having means surrounding the edge and a portion of the sides of said rotary element for removing oil therefrom with means for directing said oil to said reservoir.

9. In a lubricating system for engines, a casing, a reservoir formed integral therewith and connected with the interior of the casing by a constricted passage, a rotating element adapted to carry oil upwardly from the lower portion of the casing, and a baffle plate adapted to direct the oil thrown from the rotating element upwardly and outwardly through said constricted passage into the reservoir whereby the oil will be forced into the reservoir under pressure.

In testimony whereof, I affix my signature.

EDWARD H. BELDEN.

DISCLAIMER.

1,508,914.—*Edward H. Belden,* Toledo, Ohio. LUBRICATING SYSTEMS FOR ENGINES. Patent dated September 16, 1924. Disclaimer filed June 17, 1925, by the assignee, *The Willys-Overland Company.*

Hereby enters this disclaimer to that part of claim 9 in said specification which is in the following words, to wit, " Constricted passage," except only when such words are construed to mean *a passage with walls converging towards the exit end of the passage.*

[*Official Gazette July 7, 1925.*]